March 27, 1962 R. R. FREEMAN 3,027,305
APPARATUS FOR THE CULTIVATION OF MICROORGANISMS
Original Filed Jan. 16, 1959
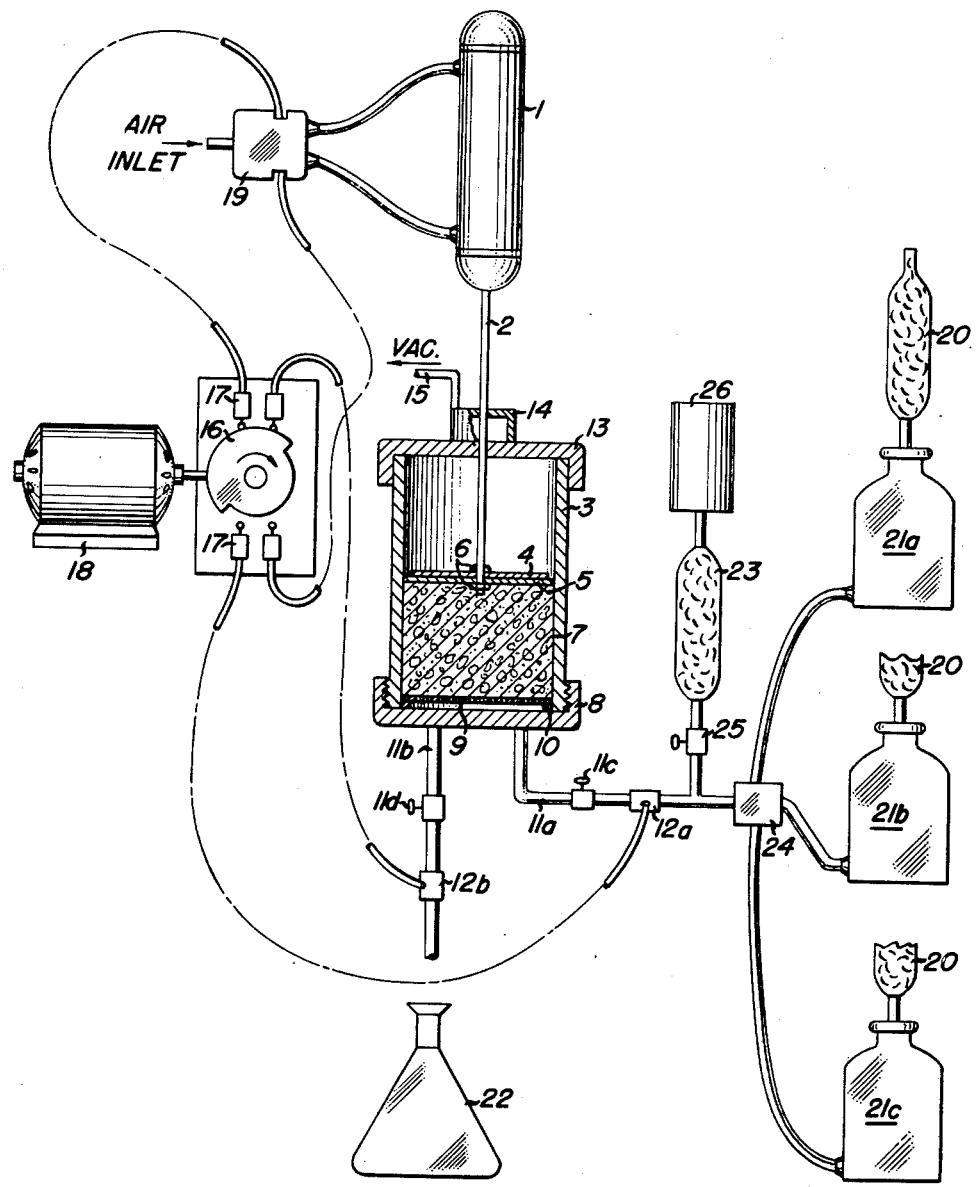
INVENTOR
Robert R. Freeman
BY George Renehan
ATTORNEY

United States Patent Office 3,027,305
Patented Mar. 27, 1962

3,027,305
APPARATUS FOR THE CULTIVATION OF MICROORGANISMS
Robert R. Freeman, Pikesville, Md., assignor to the United States of America as represented by the Secretary of the Army
Original application Jan. 16, 1959, Ser. No. 787,312, now Patent No. 2,970,088, dated Jan. 31, 1961. Divided and this application Nov. 8, 1960, Ser. No. 75,042
7 Claims. (Cl. 195—127)
(Granted under Title 35, U.S. Code (1952), sec. 266)

The invention described herein may be manufactured and used by or for the Government of the United States of America for governmental purposes without the payment to me of any royalty thereon.

This is a division of application Serial No. 787,312, filed January 16, 1959, now Patent No. 2,970,088, granted January 31, 1961.

This invention relates to a novel fermentation apparatus and a novel fermentation process for the production of microorganisms.

Heretofore, various aerobic microorganisms were produced in a deep tank which contained a liquid nutrient, wherein air was supplied by means of jets, spargers, draft tubes, etc., such that the mass transfer of oxygen to the organism is dependent upon overcoming the resistances of the various film coefficients. Usually it is necessary to provide an expensive external power source in the form of mechanical agitators to overcome this resistance. Because of this aeration and agitation, the nutrients tend to foam since the nutrients are proteinaceous. This results in the disadvantage of incurring considerable culture loss through the vent of the deep vat, or necessitating the addition of chemical antifoams. Another disadvantage of the deep culture process is the production of a very dilute suspension of microorganisms which causes the need for further concentration by evaporation, centrifugation or sedimentation.

In general, the object of my invention is to overcome these disadvantages by means of a simple and uncomplicated apparatus and process.

More specifically, the objects of my invention are as follows: (1) the use of a solid nutrient medium in the process for the production of microorganisms; (2) the use of a porous flexible material to provide a large surface area per unit volume for the support of the solid nutrient medium; and (3) a new apparatus designed to carry out the essential steps of the process which employs the use of a solid nutrient on a sponge or other type of material having a large surface area in the production of microorganisms.

Other features and advantages of my invention will become apparent during the course of the following description with reference to the attached drawing.

Referring to the drawing which shows the entire layout wherein the air operated motor 1 reciprocates piston rod 2 and piston 5 in a vertical direction. The piston can be made of most any type of flexible material but is preferably made of a Teflon sheet. A steel back-up plate 4 is attached to the Teflon piston by means of nuts 6 to provide the necessary rigidity to the plastic piston. The fermentor tank 3 contains a flexible porous support medium 7 which may be a natural or synthetic sponge. This sponge provides a very large surface area per unit volume. The sponge is supported by a perforated metal disc 9 which sits on ring 10, which in turn is held by the bottom fermentor head 8. Entrance conduit 11a for fluids to the fermentor, and exit conduit 11b for fluids from the fermentor, are supplied with manually operated valves 11c and 11d, and electrically operated solenoid valves 12a and 12b. The fermentor tank is closed at the top by its upper fermentor head 13, which contains a sealing element 14 through which the piston rod or shaft slides, and a vacuum line 15 connected to a vacuum source for removing any microorganisms which may get into the space between the top of the piston and the bottom of the upper fermentor head. Solenoid valves (not shown) are contained in the air reversing switch 19 for operating said switch. These solenoid valves along with the solenoid valves 12a and 12b are required for properly timing the operation, and they are activated by the pressure of the rotating cam 16 on the microswitches 17. The cam is turned by a variable speed motor 18 and which is employed to select and to maintain the frequency of the operating cycle.

Filters 20 and 23 are provided in order to prevent the microorganisms that are being grown in the fermentor tank from escaping to the atmosphere and to prevent the contaminating organisms in the atmosphere from entering the fermentor tank 3, the nutrient solution bottle 21a, the inoculum solution bottle 21b, and the wash solution bottle 21c. A temperature and humidity controlled air source 26 is connected to filter 23 with manual valve 25 for introducing air to the fermentor tank. Bottles 21a, 21b and 21c containing nutrient, inoculum and wash solution, respectively, are connected to inlet conduit 11a by means of a three-way valve 24. A product receiver 22 is provided to catch and hold the finished product.

In operation, the purpose of the piston is to aid in the feeding of the solutions and air to sponge 7 and the removal therefrom of the excess solutions and spent air by its reciprocating action on the sponge. The speeds of each of these operations are controlled and can be varied by the operation of the variable speed motor which in turn controls the cam, the limit switches and the solenoid valves.

My novel process will now be explained in connection with the aforementioned apparatus described above, without, however, limiting my process in the employment of said apparatus.

The process is started with the sponge being compressed by the piston. The variable speed motor is started and its speed is regulated so that it will tend to suck nutrient at the proper temperature from the nutrient bottle into the fermentor tank and sponge. This flow can be aided if the nutrient bottle is situated higher in level than the fermentor tank so that the liquid can flow by gravity. Manual valve 11c is opened but manual valve 11d is closed so that the operation of the solenoid valves in this operation is of no consequence. After the sponge is saturated with nutrient, manual valve 11c is closed and manual valve 11d is opened so that the piston on the downward stroke can remove the excess nutrient. The piston is raised, the variable speed motor is stopped and valve 11d is closed. The nutrient is allowed to cool at this point in order to solidify the nutrient. This cooling can be increased by the use of a cooling jacket, if desired.

After the nutrient has been solidified as a coating on the porous surfaces throughout the sponge, the variable speed motor is started, thereby activating the piston which compresses the sponge. Valve 11c is then opened and the three-way valve 24 is adjusted so that inoculum is drawn into the fermentor tank on the upward swing of the piston. When the sponge is saturated the excess is removed using the same procedure as used in eliminating the excess nutrient. At this point both manual valves 11c and 11d are opened, the three-way valve is closed and the valve 25 is opened, which allows air at the proper temperature to enter the fermentor tank on the upswing of the piston. After the tank is filled with air, the solenoid valve 12a closes and the solenoid valve 12b opens on the downward swing of the piston in order to force the air from the tank. This "breathing" period is maintained until the desired amount of microorganisms are produced. At this point the air supply is closed and wash solution is fed to the tank in the same manner as described for the nutrient and inoculum. When the sponge has been saturated, the speed of variable speed motor is increased in order to produce a violent agitation, thereby forcing the microorganisms and wash solution from the tank into the receiver where it is collected for further purification steps if desired.

The process as described above is extremely valuable in the production of various types of aerobic microorganisms in the laboratory. The process of course can be used for production of anaerobic microorganisms by eliminating the addition of air to the system, and by controlling the temperature by other well known means, for example, the use of a heating jacket. It is evident that the process with a few modifications such as providing a time controller to operate the variable speed motor, and replacing the manual valves with solenoid valves, can be converted into an uninterrupted cyclic process for the production of any one type of microorganism.

It is also possible that a liquid nutrient can be employed in lieu of a solid nutrient; however, the use of a liquid nutrient would not be as advantageous as explained earlier.

I claim:

1. A fermentor tank having a movable piston and sponge therein, a shaft, power means, said shaft being connected to said power means and to said piston in order to move said piston; said tank comprising a cylindrical sidewall, upper fermentor head attached to said sidewalls for closing off the top of the tank, and having an aperture in the center for said shaft to extend therethrough, a sealing element attached to said upper fermentor head through which a portion of said shaft slides, said sealing element having a vacuum source connected thereto to remove by suction any microorganisms which may get into the space between the top of the piston and the bottom of said upper fermentor head, a fermentor bottom head removably attached to said cylindrical side wall and having two apertures therethrough for connecting with two conduits, a ring support held by said bottom head, and a perforated plate held by said ring which is used to support said sponge.

2. A fermentor system for the production of microorganisms which comprises a fermentor tank, a solid support medium which provides a large surface area per unit volume contained in said tank, conduit lines with manual and electrical solenoid valves for supplying and removing materials to and from said tank, power means connected to said tank for forcing the reactants to the tank and the products from said tank, and control means connected to said power means and to said solenoid valves for producing the desired feed and removal rate of the reactants and products to and from said fermentor tank; said power means comprising a fluid pressure means, and a piston means which is positioned within said fermentor tank.

3. A fermentor system as set forth in claim 2 wherein said solid support medium comprises a porous, flexible, spongy type of material which is used to support the nutrient and inoculum substances.

4. A fermentor system as set forth in claim 2 in which said control means comprises a motor driven cam with a series of limit switches which activate said power means and said solenoid valves.

5. A fermentor system as set forth in claim 2 in which said piston means comprises a piston made of a plastic sheet, a steel back-up plate connected to said plastic piston to provide rigidity, and a shaft connecting the back-up plate and plastic piston with said fluid pressure means.

6. A fermentor system as set forth in claim 2 wherein said fluid pressure means comprises an air operated motor and an air reversing switch.

7. A fermentor system as set forth in claim 6 wherein said solid support medium comprises a porous, flexible, spongy type of material which is used to support the nutrient and inoculum substances.

References Cited in the file of this patent
UNITED STATES PATENTS
454,586   Bachmann _____ June 23, 1891